United States Patent
Kim et al.

(10) Patent No.: US 9,237,539 B2
(45) Date of Patent: Jan. 12, 2016

(54) METHOD AND APPARATUS FOR CORRECTING REFERENCE TIME FOR DISTRIBUTED TIME SYNCHRONIZATION

(71) Applicant: Electronics and Telecommunications Research Institute, Daejeon (KR)

(72) Inventors: Hyun-jae Kim, Incheon (KR); Jung Hyun Kim, Daejeon (KR); Jihyung Kim, Daejeon (KR); Kwang Jae Lim, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 145 days.

(21) Appl. No.: 14/089,200

(22) Filed: Nov. 25, 2013

(65) Prior Publication Data

US 2014/0185592 A1    Jul. 3, 2014

(30) Foreign Application Priority Data

Jan. 3, 2013  (KR) .......................... 10-2013-0000749

(51) Int. Cl.
*H04W 56/00*    (2009.01)
*H04W 84/18*    (2009.01)
*H04W 4/00*    (2009.01)

(52) U.S. Cl.
CPC .......... *H04W 56/0015* (2013.01); *H04W 56/00* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,826,860 B2 * | 11/2010 | Worfolk et al. ............... | 455/502 |
| 8,401,560 B2 * | 3/2013 | Potkonjak ..................... | 455/446 |
| 2009/0310490 A1 * | 12/2009 | Sekine .......................... | 370/238 |
| 2011/0134895 A1 * | 6/2011 | Sakaguchi et al. ............ | 370/338 |
| 2012/0014300 A1 * | 1/2012 | Lee et al. ...................... | 370/310 |
| 2014/0114456 A1 * | 4/2014 | Stavropoulos et al. ......... | 700/94 |
| 2014/0254474 A1 * | 9/2014 | Bhaskar et al. ............... | 370/316 |

FOREIGN PATENT DOCUMENTS

| | | |
|---|---|---|
| EP | 2464179 A2 | 6/2012 |
| JP | 4931108 B2 | 5/2012 |

* cited by examiner

*Primary Examiner* — Eunsook Choi
(74) *Attorney, Agent, or Firm* — Rabin & Berdo, P.C.

(57) ABSTRACT

In a wireless communication system formed of a plurality of nodes, an arbitrary node receives messages broadcasted from neighbor nodes and calculates amounts of changes in receiving times that are differences between receiving times when the messages are currently received and receiving times when the messages are previously received with respect to the neighbor nodes. The node corrects reference time thereof based on the amounts of changes calculated with respect to the neighbor nodes.

8 Claims, 8 Drawing Sheets

METHOD AND APPARATUS FOR CORRECTING REFERENCE TIME FOR DISTRIBUTED TIME SYNCHRONIZATION

CROSS-REFERENCE TO RELATED APPLICATION

This application claims priority to and the benefit of Korean Patent Application No. 10-2013-0000749 filed in the Korean Intellectual Property Office on Jan. 3, 2013, the entire contents of which are incorporated herein by reference.

BACKGROUND OF THE INVENTION (a) Field of the Invention

The present invention relates to reference time correction. More particularly, the present invention relates to a method and an apparatus for correcting reference time for distributed time synchronization in a wireless communication system.

(b) Description of the Related Art

In a wireless communication system that requires distributed control such as a wireless mesh network or an AD-hoc network, in order to improve mobility of nodes and to perform flexible work, synchronization for stabilizing time and frequency offset is required when a network is initially formed or when a network is re-constituted.

In relation to time synchronization, a method of performing distributed time synchronization that may be more flexibly applied to mobility of nodes and expandability to a multi-hop is more efficient than a topology structure of a centralized method of performing time synchronization based on a reference node.

Time synchronization among nodes in a wireless mesh network may be performed using a global positioning system (GPS) based clock. However, due to vulnerability to a shadow region and a jamming signal, a method of performing distributed time synchronization without using the GPS is necessary.

In order to perform distributed time synchronization among nodes, round trip delay (RTD) values of the nodes are updated using a periodic ranging process, and a position of reference time is periodically corrected so that reference time is shared by all of neighbor nodes. As described above, in order to perform the distributed time synchronization among the nodes, it is necessary to measure the RTD values of the nodes using distributed ranging and to manage reference time of a distributed mesh network.

However, in the distributed mesh network, due to differences in frequency offsets of oscillators that generate frame reference times of the nodes, as time goes by, the frame reference times of the nodes are changed. Therefore, during a periodically performed distributed ranging operation, since the reference time that must be shared by the nodes is changed, it is not possible to measure correct RTD.

SUMMARY OF THE INVENTION

An object of the present invention is to provide a method and an apparatus for periodically correcting reference time determined by distributed ranging in a wireless communication system.

There is provided a method for a node to correct reference time in a wireless communication system formed of a plurality of nodes, including receiving messages broadcasted from neighbor nodes; calculating amounts of changes in receiving times that are differences between receiving times when the messages are currently received and receiving times when the messages are previously received with respect to the neighbor nodes; and correcting the reference time based on the amounts of changes calculated with respect to the neighbor nodes.

The correcting of the reference time may include calculating an average value of the amounts of changes in the receiving times calculated with respect to the neighbor nodes and correcting the reference time using the average value. The calculating of the average value may include summing the amounts of changes in the receiving times of the neighbor nodes and dividing the sum by the number of nodes obtained by adding 1 to the number of neighbor nodes to obtain the average value.

A position of the reference time may be moved by the average value in correcting the reference time.

The average value may be calculated every set-up period so that the reference time is corrected in correcting the reference time. The amounts of changes in the receiving times of the neighbor nodes may be offsets between receiving times of messages received in a (the set up period−1)th frame and receiving times of messages received in a (the set up period−2)th frame.

An apparatus for correcting reference time in a wireless communication system formed of a plurality of nodes may include a message receiving unit for receiving messages broadcasted from neighbor nodes, a receiving time measuring unit for measuring receiving times when the messages are received from the neighbor nodes, a receiving time change amount calculating unit for calculating amounts of changes in receiving times that are differences between currently measured receiving times and receiving times when the messages are previously received, an average value calculating unit for calculating an average value based on the amounts of changes calculated with respect to the neighbor nodes, and a time correcting unit for correcting reference time using the average value.

The average value calculating unit may sum the amounts of changes in the receiving times of the neighbor nodes and may divide the sum by the number of nodes obtained by adding 1 to the number of the neighbor nodes to obtain the average value.

The time correcting unit may correct reference time using the average value every set-up period. The amounts of changes in the receiving times of the neighbor nodes may be offsets between receiving times of messages received in a (the set up period−1)th frame and receiving times of messages received in a (the set up period−2)th frame.

The set up period may be smaller than a periodic ranging period with respect to the neighbor nodes.

DETAILED DESCRIPTION OF THE EMBODIMENTS

Figure 1:
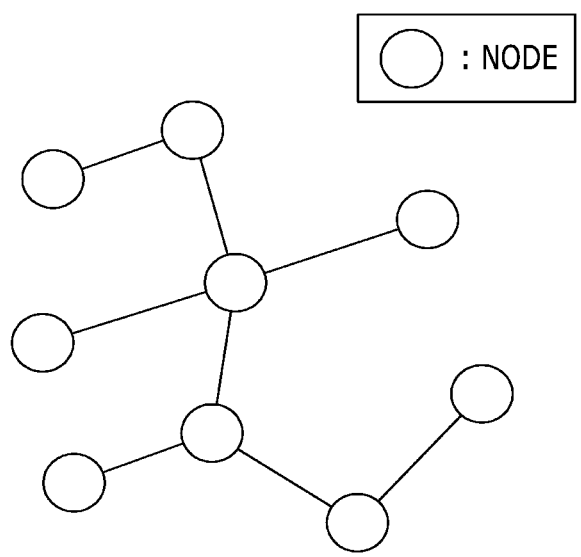
FIG. 1 is a view illustrating a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, unless explicitly described to the contrary, the word "comprise" and variations such as "comprises" or "comprising" will be understood to imply the inclusion of stated elements but not the exclusion of any other elements.

In the present specification, a node may refer to a terminal, a mobile station (MS), a mobile terminal (MT), a subscriber station (SS), a portable subscriber station (PSS), user equipment (UE), and an access terminal (AT) and may include an entire function or a partial function of the terminal, the MS, the MT, the SS, the PSS, the UE, and the AT.

Hereinafter, a method and an apparatus for correcting reference time for distributed time synchronization according to an exemplary embodiment of the present invention will be described with reference to the drawings.

FIG. 1 is a view illustrating a wireless communication system according to an exemplary embodiment of the present invention.

A wireless communication system according to an exemplary embodiment of the present invention represents a network system in which communications are performed among nodes that form a network such as a wireless mesh network or a mobile AD-hoc network.

In FIG. 1, an ad-hoc network system in which a plurality of nodes communicate with each other by multi-hop is illustrated as a wireless communication system according to an exemplary embodiment of the present invention.

Referring to FIG. 1, the ad-hoc network system may include a plurality of nodes. The nodes communicate with neighbor nodes without a central control unit such as a base station or an access point (AP). The nodes may perform communications by orthogonal frequency division multiple access (OFDMA).

In the wireless communication system, a node (referred to as an entry node) that tries to enter a network performs a network entering process with reference time Tr adjusted to a node (referred to as a sponsor node) that previously accesses a network.

Figure 2:
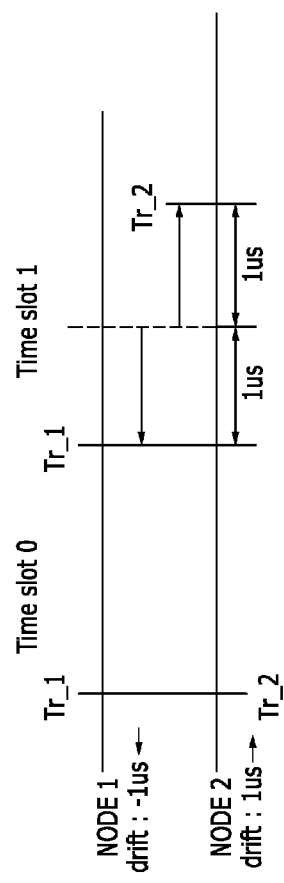
FIG. 2 is an exemplary configuration illustrating reference time of nodes and a change in the reference time.

FIG. 2 is an exemplary configuration illustrating reference time of nodes and a change in the reference time.

For example, as illustrated in FIG. 2, reference time Tr may be shared by a node 1 and a node 2 in a time slot 0. However, when the reference time of the node 1 is changed by −1 μs and the reference time of the node 2 is changed by 1 μs every time slot, an error of reference time Tr of 2 μs exists between the two nodes in a time slot 1.

When a distributed ranging process is performed in such a state, the following result is caused.

Figure 3:
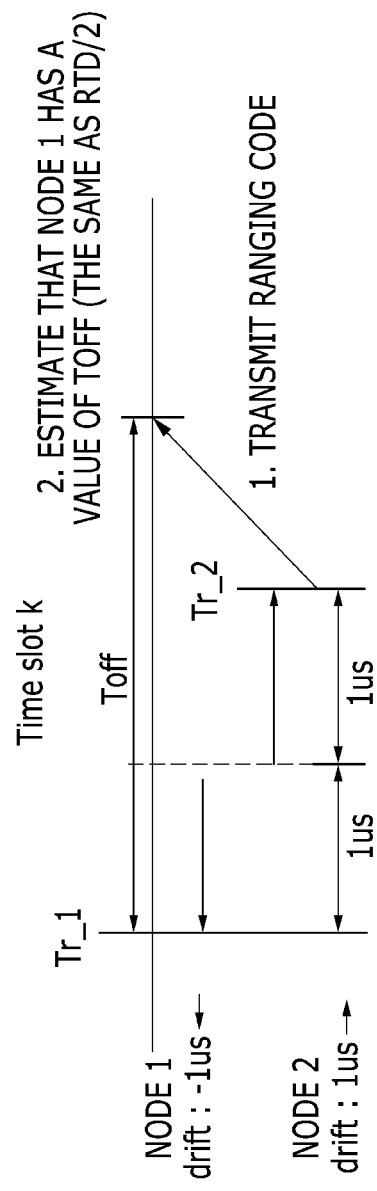
FIG. 3 is a view illustrating a distributed ranging process.

FIG. 3 is a view illustrating a distributed ranging process. When the distributed ranging process is performed in a state where an error of reference time exists between the node 1 and the node 2, the node 2 transmits a periodic ranging code in order to measure round trip delay (RTD) with respect to the node 1. At this time, since positions of reference times of the nodes, that is, reference time Tr_1 of the node 1 and reference time Tr_2 of the node 2, are changed as time goes by as illustrated in FIG. 3, the node 1 calculates receiving time of the ranging code transmitted by the node 2 as a larger value than that of real RTD. Therefore, an error is generated in the RTD value used in a distributed synchronization process so that performance is deteriorated.

According to an exemplary embodiment of the present invention, amounts of changes in receiving times of messages periodically broadcasted from neighbor nodes are measured and reference time is corrected based on the amounts of changes in the receiving times of the neighbor nodes.

A node that enters a network may perform a distributed synchronization function. In order to perform distributed synchronization, a broadcasting message such as a network configuration (NCFG) message may be broadcasted.

Each node receives broadcasting messages broadcasted from neighbor nodes and corrects reference time based on receiving times.

To be specific, the node calculates differences between receiving times when broadcasting messages are received from neighbor nodes and the reference time thereof. Then, the node calculates differences between receiving times when broadcasting messages are currently received from neighbor nodes and receiving times when broadcasting messages are previously received after a predetermined period. Such time differences are referred to as offsets of receiving times. According to an exemplary embodiment of the present invention, offsets of receiving times that are amounts of changes in receiving times of neighbor nodes are measured, an average value of the measured offsets of the receiving times of the neighbor nodes is obtained, and reference time is corrected based on the average value.

For example, a process of correcting reference time based on offsets of receiving times of a broadcasting message will be described with reference to the node 1 and the node 2.

Figure 4:
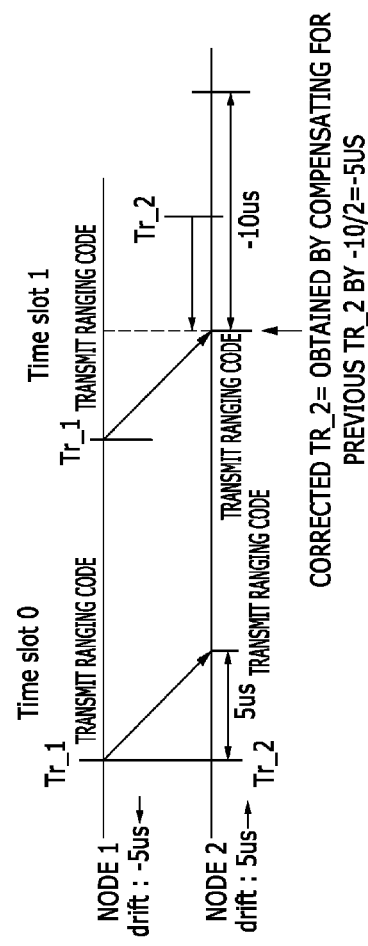
FIGS. 4 and 5 are exemplary configurations illustrating a reference time correcting process according to an exemplary embodiment of the present invention.
Figure 5:
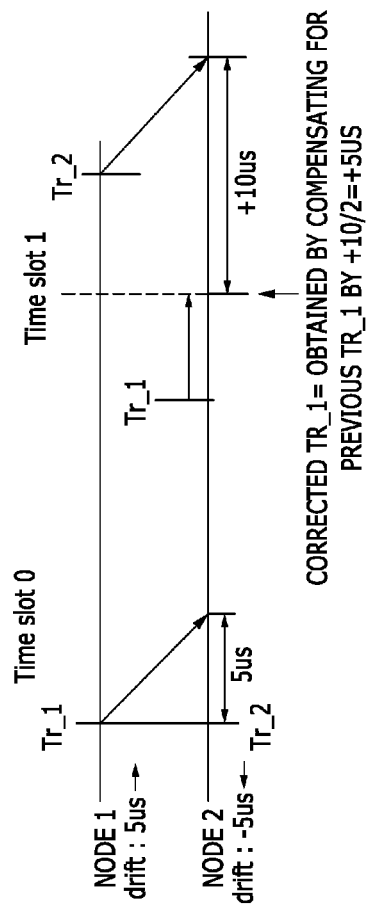

FIGS. 4 and 5 are exemplary configurations illustrating a reference time correcting process according to an exemplary embodiment of the present invention.

As illustrated in FIGS. 4 and 5, it is assumed that the node 1 and the node 2 have reference times Tr_1 and Tr_2, that the reference time of the node 1 is changed by −5 μs every time slot, and that the reference time of the node 2 is changed by 5 μs every time slot.

Based on the node 2, as illustrated in FIG. 4, the reference times Tr_1 and Tr_2 of the two nodes are the same in a time slot 0.

In the time slot 0, when the node 2 receives a broadcasting message transmitted by the node 1 at the first receiving time (5 μs), the node 2 calculates a difference between the reference time Tr_2 and the first receiving time (5 μs) and first offset (5 μs).

Then, the reference time is changed as time goes by, the node 1 receives the broadcasting message from the changed reference time Tr_1, and the node 2 receives the broadcasting message from the node 1 in a time slot 1 at the second receiving time (−5 μs). The node 2 calculates a second offset (−10 μs) that is a difference between the first receiving time (5 μs) when the previous broadcasting message is received and the second receiving time (−5 μs).

The second offset (−10 μs) calculated as described above is used as an amount of change in the receiving time of the node 2, and the node 2 corrects a position of the reference time Tr_2 thereof based on a value (−5 μs) obtained by dividing the amount of change in the receiving time ΔTr_2 by the number of nodes including a neighbor node and itself, that is, 2. That is, the position of the reference time Tr_2 in the time slot 1 is corrected by −5 μs.

On the other hand, a case in which the node 1 corrects reference time will be described based on the node 1.

As illustrated in FIG. 5, the reference times Tr_1 and Tr_2 of the node 1 and the node 2 are the same in the time slot 0. When the broadcasting message broadcasted from the node 2 is received at the first receiving time (5 μs), the node 1 calculates the first offset (5 μs) that is a difference between the reference time Tr_1 thereof and the first receiving time (5 μs). As the reference time changes with the passage of time, the broadcasting message broadcasted from the node 2 based on the reference time Tr 2 is received in the time slot 1 at second receiving time (15 μs). The node 1 calculates the second offset (10 μs) that is a difference between the first receiving time (5 μs) when a previous broadcasting message is received and the second receiving time (15 μs) when a current broadcasting message is received.

The second offset (10 μs) calculated as described above is used as an amount of change in the receiving time of the node 1, and the node 1 corrects a position of the reference time Tr_1 thereof based on a value (5 μs) obtained by dividing the amount of change in the receiving time ΔTr_1 by the number of nodes, that is, 2. That is, the position of the reference time Tr_1 in the time slot 1 is corrected by 5 μs. Therefore, the node 1 and the node 2 maintain the same reference time Tr_1 and Tr_2 in the time slot 1.

Based on such reference time correction, in the wireless communication system according to the exemplary embodiment of the present invention, a node receives broadcasting messages of neighbor nodes and calculates amounts of changes in receiving times of the received messages. An average value of the amounts of changes in the receiving times calculated with respect to the neighbor nodes is obtained and the reference time of the node is corrected based on the obtained average value.

Figure 6:
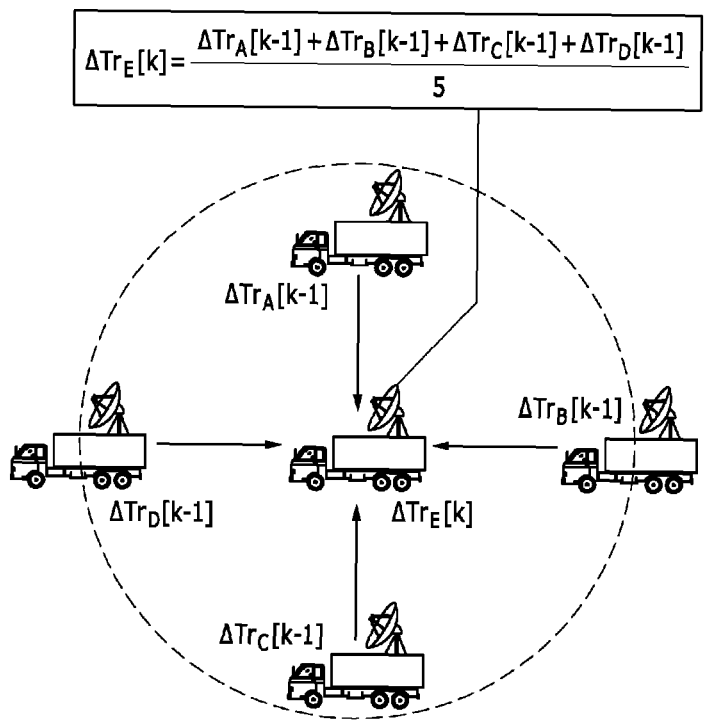
FIG. 6 is an exemplary configuration illustrating a wireless communication network formed of five nodes.

FIG. 6 is an exemplary configuration illustrating a wireless communication network formed of five nodes.

As illustrated in FIG. 6, in a wireless communication network formed of five nodes, for example, a node A, a node B, a node C, a node D, and a node E, an arbitrary node E calculates an average value of amounts of changes in receiving times as follows.

$$\Delta Tr_E[k] = \frac{\Delta Tr_A[k-1] + \Delta Tr_B[k-1] + \Delta Tr_C[k-1] + \Delta Tr_D[k-1]}{N+1} \quad \text{(Equation 1)}$$

Here, the number of neighbor nodes is N and reference time Tr is updated in a period of k (e.g., several frame units). $\Delta Tr_A$ represents an amount of change in receiving time when the node E receives a broadcasting message broadcasted from the neighbor node A. $\Delta Tr_B$ represents an amount of change in receiving time when the node E receives a broadcasting message broadcasted from the neighbor node B. $\Delta Tr_C$ represents an amount of change in receiving time when the node E receives a broadcasting message broadcasted from the neighbor node C. $\Delta Tr_D$ represents an amount of change in receiving time when the node E receives a broadcasting message broadcasted from the neighbor node D. For example, $\Delta Tr_A[k-1]$ represents an amount of change in receiving time that is offset between a receiving time when the node E receives a broadcasting message from the neighbor node A in a (k−1)th frame and a receiving time when the node E receives a broadcasting message from the neighbor node A in a (k−2)th frame that is a previous frame.

As described above, the node E divides amounts of changes in receiving times when broadcasting messages are received from the neighbor nodes by N+1 that is the number of nodes to calculate an average value $\Delta Tr_A[k]$, and corrects a position of reference time thereof based on the calculated average value $\Delta Tr_A[k]$.

Figure 7:
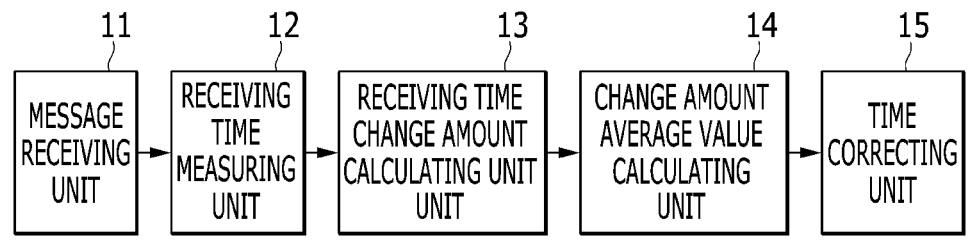
FIG. 7 is a view illustrating a structure of a reference time correcting apparatus according to an exemplary embodiment of the present invention.

FIG. 7 is a view illustrating a structure of a reference time correcting apparatus according to an exemplary embodiment of the present invention.

As illustrated in FIG. 7, a reference time correcting apparatus 1 according to an exemplary embodiment of the present invention includes a message receiving unit 11, a receiving time measuring unit 12, a receiving time change amount calculating unit 13, a change amount average value calculating unit 14, and a time correcting unit 15.

The message receiving unit 11 receives messages broadcasted from neighbor nodes.

The receiving time measuring unit 12 measures receiving times of the messages received from the neighbor nodes.

The receiving time change amount calculating unit 13 calculates amounts of changes in receiving times with respect to the neighbor nodes, and particularly, calculates amounts of changes based on offset between current receiving time and previous receiving time.

The average value calculating unit 14 calculates an average value of the amounts of changes in receiving times calculated with respect to the neighbor nodes every set-up period.

The time correcting unit 15 corrects the set-up reference time based on the average value of the amounts of changes in the receiving times calculated every set-up period.

Figure 8:
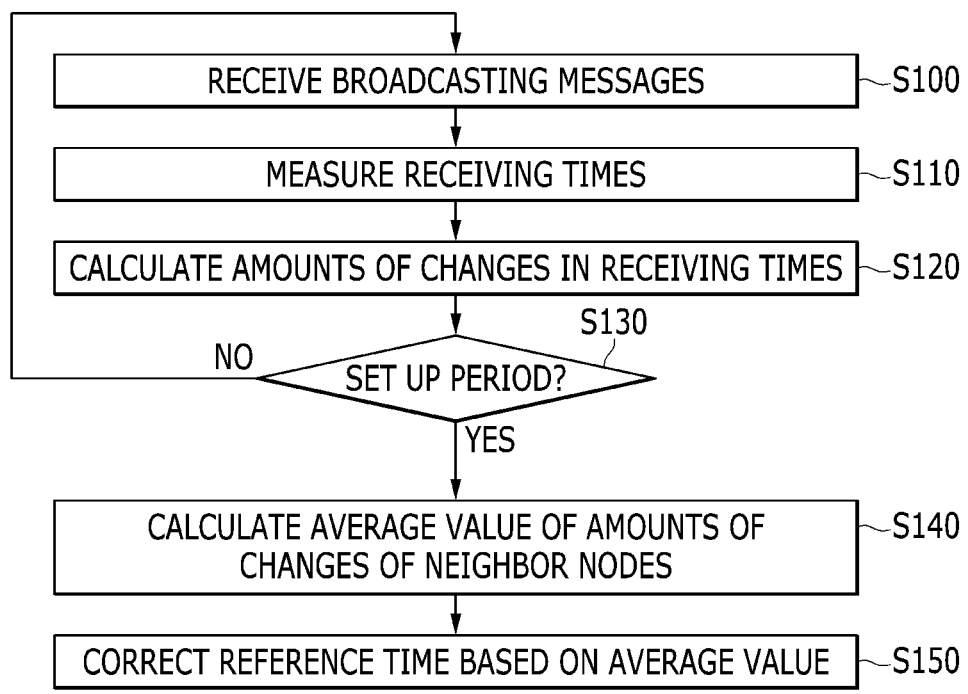
FIG. 8 is a flowchart of a reference time correcting method according to an exemplary embodiment of the present invention.

FIG. 8 is a flowchart of a reference time correcting method according to an exemplary embodiment of the present invention.

In a wireless communication network formed of a plurality of nodes, the reference time correcting apparatus 1 of an arbitrary node corrects reference time every set-up period.

For this purpose, the reference time correcting apparatus 1 receives messages broadcasted from neighbor nodes S100. The reference time correcting apparatus 1 calculates amounts of changes that are offsets between receiving times when broadcasting messages are currently received and receiving times when broadcasting messages are previously received (S110 and S120). The amounts of changes in the receiving times are updated whenever the broadcasting messages are received.

Then, in a set-up period, the reference time correcting apparatus 1 calculates an average value of the amounts of changes in the receiving times of the broadcasting messages calculated with respect to the neighbor nodes in order to correct reference time. The amounts of changes in the receiving times are summed and the sum is divided by the total number of nodes (the number of neighbor nodes plus 1) so that the average value of the amounts of changes in the receiving times is calculated (S130 and S140).

The reference time correcting apparatus 1 corrects reference time based on the calculated average value. A position of the reference time may be moved in accordance with the average value so that the reference time may be corrected (S150).

The reference time correction according to the exemplary embodiment of the present invention may be performed in a smaller period than a periodic ranging operation with respect to the neighbor nodes.

According to the exemplary embodiment of the present invention, in the wireless communication system including the plurality of nodes, the reference time among the neighbor nodes is corrected even though the reference time is changed by an oscillator frequency offset characteristic so that time synchronization may be correctly performed. In addition, a position of reference time determined by distributed ranging may be periodically corrected considering the amounts of changes in the receiving times of the broadcasting messages broadcasted by the neighbor nodes and the number of neighbor nodes.

The exemplary embodiment of the present invention is not only realized by the above-described apparatus and/or method, but may be realized by a program for realizing a function corresponding to a structure of the exemplary embodiment of the present invention and a recording medium in which the program is recorded by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a node to correct reference time in a wireless communication system formed of a plurality of nodes, the method comprising:
    receiving messages broadcasted from neighbor nodes;
    calculating amounts of changes in receiving times that are differences between receiving times when the messages are currently received and receiving times when the messages are previously received with respect to the neighbor nodes; and
    correcting the reference time based on the amounts of changes calculated with respect to the neighbor nodes, including
        summing the amounts of changes in the receiving times of the neighbor nodes to obtain a sum, and dividing the sum by the number of nodes obtained by adding 1 to the number of neighbor nodes, to thereby calculate an average value; and
        correcting the reference time using the average value.

2. The method of claim 1, wherein a position of the reference time is moved by the average value in correcting the reference time.

3. The method of claim 1, wherein the average value is calculated every set-up period so that the reference time is corrected in correcting the reference time.

4. The method of claim 3, wherein the amounts of changes in the receiving times of the neighbor nodes are offsets between receiving times of messages received in a (the set up period−1)th frame and receiving times of messages received in a (the set up period−2)th frame.

5. The method of claim 3, wherein the set-up period is smaller than a periodic ranging period with respect to the neighbor nodes.

6. An apparatus for correcting reference time in a wireless communication system formed of a plurality of nodes, the apparatus comprising:
    a message receiving unit for receiving messages broadcasted from neighbor nodes;
    a receiving time measuring unit for measuring receiving times when the messages are received from the neighbor nodes;
    a receiving time change amount calculating unit for calculating amounts of changes in receiving times that are differences between currently measured receiving times and receiving times when the messages are previously received;
    an average value calculating unit for calculating an average value based on the amounts of changes calculated with respect to the neighbor nodes; and
    a time correcting unit for correcting reference time using the average value, wherein
    the average value calculating unit sums the amounts of changes in the receiving times of the neighbor nodes and divides the sum by the number of nodes obtained by adding 1 to the number of neighbor nodes to obtain the average value.

7. The apparatus of claim 6, wherein the time correcting unit corrects reference time using the average value every set-up period, and
    wherein the amounts of changes in the receiving times of the neighbor nodes are offsets between receiving times of messages received in a (the set up period−1)th frame and receiving times of messages received in a (the set up period−2)th frame.

8. The apparatus of claim 7, wherein the reference time correcting apparatus corrects the reference time in a smaller period than a periodic ranging period with respect to the neighbor nodes.

* * * * *